United States Patent
Brück et al.

(10) Patent No.: US 8,544,266 B2
(45) Date of Patent: Oct. 1, 2013

(54) EXHAUST-GAS AFTERTREATMENT SYSTEM UPSTREAM OF A TURBOCHARGER, METHOD FOR PURIFYING EXHAUST GAS AND VEHICLE HAVING THE SYSTEM

(75) Inventors: Rolf Brück, Bergisch Gladbach (DE); Volker Jörgl, Breitenfurt (AT)

(73) Assignees: EMITEC Gesellschaft fuer Emissionstechnologie mbH, Lohmar (DE); Borg Warner Inc., Auburn Hills, MI (US)

( * ) Notice: Subject to any disclaimer, the term of this patent is extended or adjusted under 35 U.S.C. 154(b) by 459 days.

(21) Appl. No.: 12/686,534

(22) Filed: Jan. 13, 2010

(65) Prior Publication Data
US 2010/0154411 A1    Jun. 24, 2010

Related U.S. Application Data

(63) Continuation of application No. PCT/EP2008/057037, filed on Jun. 5, 2008.

(30) Foreign Application Priority Data

Jul. 13, 2007   (DE)  .................. 10 2007 032 736

(51) Int. Cl.
*F02D 23/00*     (2006.01)
*F02B 33/44*     (2006.01)
*F01N 3/00*      (2006.01)
*F01N 3/023*     (2006.01)

(52) U.S. Cl.
USPC .................... 60/602; 60/295; 60/286; 60/612

(58) Field of Classification Search
USPC .................. 60/297, 598, 612, 295, 286, 602; 123/562
See application file for complete search history.

(56) References Cited

U.S. PATENT DOCUMENTS

| | | | |
|---|---|---|---|
| 5,987,882 A | 11/1999 | Voss et al. | |
| 6,651,432 B1 * | 11/2003 | Gray, Jr. | ...................... 60/605.2 |
| 6,865,882 B2 | 3/2005 | Minami | |
| 6,981,370 B2 * | 1/2006 | Opris et al. | ...................... 60/311 |
| 7,267,805 B2 | 9/2007 | Brück et al. | |
| 7,563,414 B2 | 7/2009 | Brück | |

(Continued)

FOREIGN PATENT DOCUMENTS

| | | |
|---|---|---|
| DE | 19956671 A1 | 5/2001 |
| DE | 10257113 A1 | 6/2004 |

(Continued)

OTHER PUBLICATIONS

International Search Report, dated Sep. 4, 2008.

*Primary Examiner* — Thai Ba Trieu
(74) *Attorney, Agent, or Firm* — Laurence A. Greenberg; Werner H. Stemer; Ralph E. Locher

(57) ABSTRACT

An exhaust-gas aftertreatment system for an internal combustion engine of a vehicle includes at least one exhaust line, at least one turbocharger and at least one exhaust-gas converter. The at least one exhaust-gas converter is provided between the internal combustion engine and the at least one turbocharger and has a first volume of at least 0.6 liters. A method for purifying exhaust gas and a vehicle having the system, are also provided.

10 Claims, 1 Drawing Sheet

(56) References Cited

U.S. PATENT DOCUMENTS

| | | | |
|---|---|---|---|
| 7,628,008 B2 * | 12/2009 | Ranalli | 60/278 |
| 8,191,354 B2 * | 6/2012 | Cavataio et al. | 60/612 |
| 2003/0213231 A1 | 11/2003 | Tabata | |
| 2004/0216451 A1 * | 11/2004 | LaBarge et al. | 60/295 |
| 2006/0021335 A1 * | 2/2006 | Opris | 60/297 |
| 2006/0059910 A1 * | 3/2006 | Spaeder et al. | 60/612 |
| 2008/0034739 A1 * | 2/2008 | Ranalli | 60/295 |
| 2008/0120968 A1 * | 5/2008 | Beall et al. | 60/295 |
| 2008/0223019 A1 * | 9/2008 | Gonze et al. | 60/286 |
| 2009/0038293 A1 * | 2/2009 | Miyashita | 60/287 |
| 2012/0216529 A1 * | 8/2012 | Joshi et al. | 60/612 |

FOREIGN PATENT DOCUMENTS

| | | | |
|---|---|---|---|
| DE | 10304205 A1 | | 7/2004 |
| DE | 102004045178 A1 | | 3/2006 |
| EP | 1260684 A2 | | 11/2002 |
| EP | 1353046 A1 | * | 10/2003 |
| EP | 1435439 A1 | | 7/2004 |
| JP | 2003301713 A | | 10/2003 |
| JP | 2003535253 A | | 11/2003 |
| JP | 2004100489 A | | 4/2004 |
| JP | 2004204699 A | | 7/2004 |
| JP | 2006057570 A | | 3/2006 |
| JP | 2010121521 A | * | 6/2010 |
| WO | WO 2010052055 A1 | * | 5/2010 |

* cited by examiner

EXHAUST-GAS AFTERTREATMENT SYSTEM UPSTREAM OF A TURBOCHARGER, METHOD FOR PURIFYING EXHAUST GAS AND VEHICLE HAVING THE SYSTEM

CROSS-REFERENCE TO RELATED APPLICATION

This is a continuation application, under 35 U.S.C. §120, of copending International Application No. PCT/EP2008/057037, filed Jun. 5, 2008, which designated the United States; this application also claims the priority, under 35 U.S.C. §119, of German Patent Application DE 10 2007 032 736.8, filed Jul. 13, 2007; the prior applications are herewith incorporated by reference in their entirety.

BACKGROUND OF THE INVENTION

Field of the Invention

The present invention relates to an exhaust-gas aftertreatment system for an internal combustion engine of a vehicle, in which the exhaust-gas aftertreatment system has at least one exhaust line, at least one turbocharger and at least one exhaust-gas converter. The exhaust-gas aftertreatment system is, in particular, a system for the aftertreatment of exhaust gas of a lean-burn engine of a passenger motor vehicle. The invention also relates to a method for purifying exhaust gas and a vehicle having the system.

In past years, the focus has been on adhering to exhaust-gas legislation for spark-ignition engines, although that situation has recently changed. There is an increased public awareness of the significance of the environmental impact of diesel engines. The reasons therefor are firstly the discussion of a particular health risk posed by the particle emissions of that engine type, and secondly the drastically rising numbers of diesel vehicles registered in Europe. Decisive factors in that development are not only reasons of economy but also the driving behavior of vehicles with modern diesel engines, which is distinguished by high torque at low engine speeds. In order to keep the pollutant emissions as low as possible, a plurality of different systems have already been developed and brought into use, such as for example improved injection systems (common rail systems with relatively high injection pressures), advanced exhaust-gas turbocharger and exhaust-gas recirculation technologies and model-based combustion processes for control or regulation. Furthermore, in certain operating ranges, despite compression ignition being maintained in principle, newer diesel engines are distinguished to a greater or lesser extent by homogeneous combustion processes (HCCI: Homogeneous Charge Compression Ignition). Engines of that type have extremely low nitrogen oxide emissions and soot emissions in that operating mode. The carbon monoxide and hydrocarbon emissions are, however, possibly increased. Although tried and tested technologies in the form of oxidation catalytic converters are available for the elimination of those pollutants, the level of the emissions in connection with the low exhaust-gas temperatures typical of diesel engines pose considerable difficulties.

SUMMARY OF THE INVENTION

It is accordingly an object of the invention to provide an exhaust-gas aftertreatment system upstream of a turbocharger, a method for purifying exhaust gas and a vehicle having the system, which overcome the hereinafore-mentioned disadvantages and at least partially solve the specified technical difficulties and problems of the heretofore-known devices and methods of this general type. In this case, the exhaust-gas aftertreatment system should, in particular, operate with uniform effectiveness over different operating states of a diesel engine or lean-burn engine, and should nevertheless be cost-effective to produce.

With the foregoing and other objects in view there is provided, in accordance with the invention, an exhaust-gas aftertreatment system for an internal combustion engine of a vehicle. The exhaust-gas aftertreatment system comprises at least one exhaust line, at least one turbocharger, and at least one exhaust-gas converter disposed between the internal combustion engine and the at least one turbocharger, the at least one exhaust-gas converter having a first volume of at least 0.6 liters.

The exhaust system can, for example, be of initially multi-strand or multi-track construction proceeding from the internal combustion engine, in such a way that for example, a separate exhaust line is provided for each outlet of the combustion chamber. The exhaust line sections, also referred to overall as a fan-type manifold, can subsequently be merged to form a common exhaust line. An exhaust line (or plurality of exhaust lines) of that type can be formed with an exhaust-gas turbocharger. A turbocharger of that type serves to increase the power of the internal combustion engine by increasing the air quantity throughput and fuel throughput per working stroke. The turbocharger is driven in this case by the exhaust-gas pressure, with it also being possible for the turbocharger to utilize the exhaust-gas speed as an energy source (impulse supercharging). A turbocharger is composed of an exhaust-gas turbine in the exhaust-gas flow, in which the exhaust-gas turbine is connected through the use of a shaft to a compressor in the intake tract for the internal combustion engine. The turbine is set in rotation by the exhaust-gas flow of the internal combustion engine and thereby drives the compressor. The compressor increases the pressure in the intake tract of the internal combustion engine in such a way that a greater quantity of air passes into the combustion chamber during the intake stroke. More oxygen is therefore available for the combustion of a correspondingly greater fuel quantity. It is thereby possible to obtain a considerable increase in power of the internal combustion engine (in particular of the diesel engine).

In order to provide sufficient energy in the turbocharger for this purpose, use has heretofore been made of the concept of introducing the exhaust-gas flow into the turbocharger with high energy. This has also been the reason that only very small exhaust-gas treatment units have been inserted into the region between the internal combustion engine and the turbocharger in order to prevent a pressure drop and therefore a reduced compression action of the exhaust-gas turbocharger. For example, so-called pre-turbocharger catalytic converters ("PTC", pre-turbocharger-catalyst) are known which are positioned either in the exhaust line directly downstream of the outlet valves in a cylinder head of the internal combustion engine, in the manifold upstream of the exhaust-gas turbocharger or directly upstream or even in the exhaust-gas turbocharger. By positioning an oxidation catalytic converter at this point close to the engine, the oxidation catalytic converter (in particular having a surface which generates a turbulent flow) can further increase the exhaust-gas temperature as a result of an exothermic reaction, and thereby "heat up" subsequent exhaust-gas purification components.

The invention now departs from that path for the first time and proposes that the exhaust-gas converter positioned upstream of the turbocharger have a first volume of at least 0.6 l (liter). In this case, the in particular catalytically active exhaust-gas converter now no longer serves simply to provide a temperature increase for the downstream exhaust-gas treatment units, but also ensures significant conversion of the pollutants contained in the exhaust gas, in particular hydrocarbons (HC), carbon monoxide (CO), nitrogen oxides, particles, etc. Exhaust-gas converters of this type are often constructed in the form of a honeycomb body, with the latter being formed with ceramic or (preferably) with metallic walls. For this purpose, the walls can be formed at least partially with corresponding coatings: oxidation catalytic converter, 3-way catalytic converter, adsorber coating. Furthermore, the structure can also be correspondingly adapted, for example as a so-called secondary flow filter or wall-flow filter. In this case, the volume is formed by the sum of the walls and channels. Under some circumstances, in particular for very large internal combustion engines, it can even be advantageous to provide an even larger first volume of the exhaust-gas converter upstream of the turbocharger, such as for example a first volume of at least 1.0 l or even 1.5 l.

This is a departure, for the first time, from the concept of the exhaust-gas treatment taking place primarily in the underbody region of the vehicle, which has been followed for decades. In this case, it is proposed to provide such a large volume of the exhaust-gas converter upstream of the turbocharger despite the extremely restricted space conditions in the engine compartment of vehicles and despite the pressure drop of the exhaust gas which increases with volume. Although it is fundamentally possible for the first volume specified in this case to be formed by a plurality of exhaust-gas converters positioned between the internal combustion engine and the at least one turbocharger, it is preferable to provide a single exhaust-gas converter with the first volume specified in this case.

In accordance with another feature of the exhaust-gas aftertreatment system of the invention, the at least one exhaust-gas converter has a first volume which is larger than a second volume of at least one exhaust-gas aftertreatment unit that is situated opposite the at least one turbocharger. This means, in particular, that the exhaust-gas aftertreatment system is formed with an (in particular catalytically active) exhaust-gas converter upstream of the turbocharger and an exhaust-gas aftertreatment unit which (also) has the same function as the exhaust-gas converter, with the larger reaction volume being provided upstream of the turbocharger. In this way, for example due to the larger catalytically active surface in the exhaust-gas converter and the relatively high temperatures which prevail there due to the proximity to the engine, a significantly greater proportion of the relevant pollutants are converted. In this way, the exhaust-gas aftertreatment system can be of more cost-effective construction overall, in particular if the exhaust-gas converter upstream of the turbocharger is provided with turbulence-generating structures in or on the walls (holes, flow constrictions, flow deflections etc.).

In accordance with a further feature of the exhaust-gas aftertreatment system, the invention very particularly envisages that the at least one exhaust-gas converter includes an oxidation catalytic converter. This means, in particular, that the exhaust-gas converter is constructed in the form of a honeycomb body, preferably with at least partially structured metallic sheet-metal foils on which a substrate substance (for example washcoat) and a corresponding catalyst such as a noble metal (platinum, rhodium etc.) are provided. With the size of the oxidation catalytic converter proposed in this case, it is possible under some circumstances to combine several functions. It is, for example, possible for nitrogen dioxide to also be produced in addition to the conversion of hydrocarbons and carbon monoxides, for example in order to be able to continuously regenerate a downstream particle separator.

In accordance with an added feature of the exhaust-gas aftertreatment system of the invention, an exhaust-gas aftertreatment system is also preferable in which the at least one exhaust-gas converter includes an oxidation catalytic converter and a particle separator. In this case, the particle separator can be constructed as a so-called wall-flow filter with alternately closed-off flow paths and porous walls, although open particle separators are preferable which have no flow dead-ends and which are, in particular, constructed with metallic components including at least sheet-metal foils, wire cloth, fibrous nonwovens or the like. For the particle separation, it is also possible for at least one of the following effects to be used: electrostatic charging of the particles, agglomeration of the particles, thermophoresis, diffusion, convection etc.

In accordance with an additional feature of the exhaust-gas aftertreatment system of the invention, it is very particularly preferable if the exhaust-gas aftertreatment system according to the invention has at least one exhaust-gas converter positioned in a collecting chamber or space for a plurality of exhaust line sections. This means, in particular, that the exhaust-gas converter is formed as one component, and that the exhaust-gas converter is disposed in the region of the junction of the individual manifold tubes to form a common exhaust line. In this case, it is possible, in particular, to make use of non-cylindrical exhaust-gas converters and/or exhaust-gas converters which are traversed by flow radially.

In accordance with yet another feature of the exhaust-gas aftertreatment system of the invention, the at least one turbocharger is constructed with two stages. A two-stage turbocharger is therefore provided in particular. The two-stage turbocharger has a low-pressure stage and a high-pressure stage which each include one compressor and one turbine. The respective turbines and compressors are connected to one another through the use of a common shaft. Two turbochargers of different size are therefore used in particular, that is a small turbocharger for the low engine-speed range and a larger turbocharger for the upper rotational speed range with large amounts of air throughput. The two turbochargers are connected to one another in series on the exhaust-gas side and on the air side and are adapted to the respective speed and load range of the engine through the use of bypass flaps. One to two charge-air coolers may be necessary depending on the charge-pressure level.

With the objects of the invention in view, there is also provided a method for purifying an exhaust gas of an internal combustion engine with an exhaust-gas aftertreatment system having at least one turbocharger. The method comprises converting all of the exhaust gas by oxidation to a greater extent or degree between the internal combustion engine and the turbocharger than in a region downstream of the turbocharger. This method can be realized, in particular, with the exhaust-gas aftertreatment system explained herein according to the invention.

In this case, conversion "to a greater degree" means for example that, in a reproducible standard test, the (mass) proportion of hydrocarbons (HC) and/or carbon monoxide (CO) which is converted upstream of the turbocharger is greater than the (mass) proportion converted by the following exhaust-gas aftertreatment units. Due to the increased temperature in the vicinity of the engine, this can also be achieved with a first volume of the exhaust-gas converter which is smaller than the exhaust-gas aftertreatment units, although it is preferable for the greater degree to be associated with a larger first volume. With regard to this method, reference is otherwise made to the above-specified effects of the device.

With the objects of the invention in view, there is concomitantly provided a vehicle, comprising an exhaust-gas aftertreatment system as described herein according to the invention to be operated with a method which is likewise described herein according to the invention, with these lending themselves to use with internal combustion engines in the form of a lean-burn engine. In this case, a "lean-burn engine" is an internal combustion engine which is regularly operated with an excess of air, such as for example a diesel engine.

Other features which are considered as characteristic for the invention are set forth in the appended claims, noting that the features specified individually in the claims can be combined in any desired technologically meaningful way and highlight further embodiments of the invention.

Although the invention is illustrated and described herein as embodied in an exhaust-gas aftertreatment system upstream of a turbocharger, a method for purifying exhaust gas and a vehicle having the system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
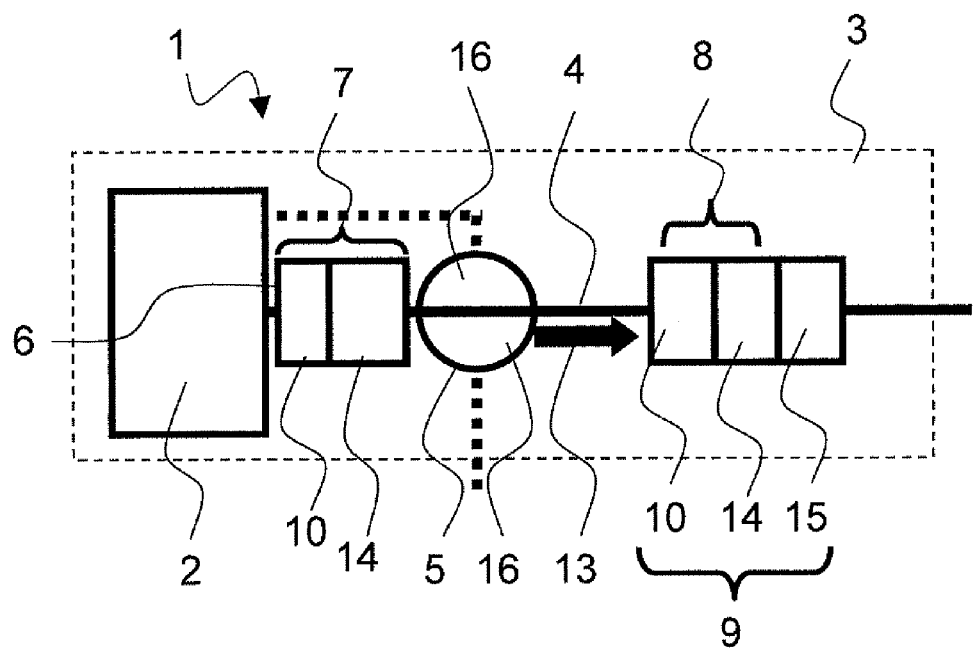
FIG. 1 is a diagrammatic, plan view of a first embodiment variant of an exhaust-gas aftertreatment system of a vehicle.

Referring now in detail to the figures of the drawings, which show exemplary embodiments that are not intended to restrict the invention and first, particularly, to FIG. 1 thereof, there is seen a diagrammatic illustration of a vehicle 3 which has an internal combustion engine 2 in the form of a diesel engine, in which exhaust gas generated in the internal combustion engine is conducted through an exhaust-gas aftertreatment system 1. In the example shown herein, the exhaust gas flows in a flow direction 13 firstly through an exhaust-gas converter 6, then through a turbocharger 5 (which is constructed with two stages 16), before the exhaust gas flows on through an exhaust line 4, for example into an underbody region of the vehicle 3, where further exhaust-gas aftertreatment units 9, in this case for example an oxidation catalytic converter 10, a particle separator 14 and an SCR catalytic converter 15 are provided.

In this case, the exhaust-gas converter 6, which is provided between the internal combustion engine 2 and the turbocharger 5, has a first volume 7 which is larger than a second volume 8 of the exhaust-gas aftertreatment units 9 that perform the same functions. In this case, the exhaust-gas converter 6 is formed by a combination of an oxidation catalytic converter 10 and an oxidatively coated particle separator 14. In the embodiment variant shown herein, the exhaust-gas converter 6 is, for example, provided, like the oxidation catalytic converter 10 and the particle separator 14, with an oxidation coating. The SCR catalytic converter (SCR=selective catalytic reaction) has a reduction coating and therefore a different function. Consequently, the first volume 7 in this case is larger than the second volume 8 formed by the oxidation catalytic converter 10 and the particle separator 14 (with the intermediate space being neglected), although this is not strictly necessary.

Figure 2:
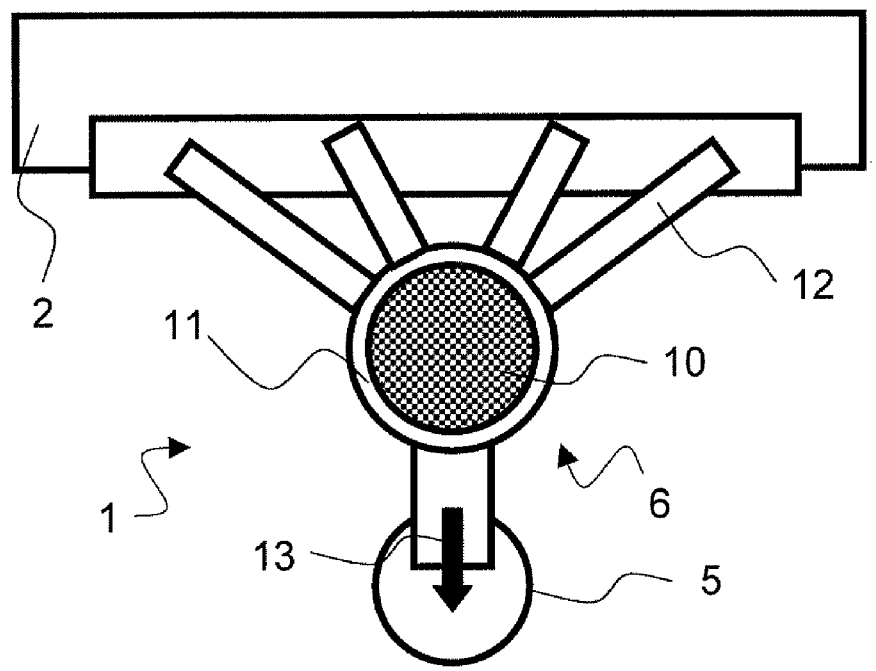
FIG. 2 is an enlarged, plan view of a further embodiment variant of an exhaust-gas aftertreatment system according to the invention.

FIG. 2 is, by way of example, a plan view of part of an internal combustion engine 2 with following exhaust line sections 12, also referred to as a manifold. The individual exhaust line sections 12 open out into a common collecting chamber or space 11 in which an oxidation catalytic converter 10 is again provided in this case as a first catalytic converter 6. The exhaust gas flowing into the exhaust-gas converter 6 through the exhaust line sections 12 is correspondingly catalytically treated and thereafter leaves the exhaust-gas converter 6 (together) in the flow direction 13 and flows further towards the turbocharger 5 disposed downstream.

It goes without saying that modifications can of course also be carried out. It is, for example, possible for the exhaust-gas treatment system 1 to have exhaust lines 4 which remain separate until downstream of a plurality of exhaust-gas turbochargers 5. It is also possible for a plurality of exhaust-gas converters 6 to be provided between the internal combustion engine 2 and the at least one turbocharger 5. Furthermore, the exhaust-gas converter 6 can also include another exhaust-gas aftertreatment unit 9, such as for example a particle separator, in addition to an oxidation catalytic converter 10. Furthermore, it is also possible for devices for introducing liquid and/or gaseous reducing agents to be provided in connection specifically with an SCR catalytic converter. In addition, the exhaust-gas converter 6 can be formed with openings in the channel walls and/or guide blades and/or flow constrictions and/or turbulence-generating points in order to realize a turbulent flow in the interior and to thereby improve the contact between the pollutants to be converted and the catalytically active coating of the exhaust-gas converter. This is proposed, in particular, in the knowledge of the associated pressure loss which has a corresponding influence on the downstream turbocharger 5. If appropriate, a plurality of turbochargers 5 can then also be provided in series in the flow direction of the exhaust gas in order to slightly compensate for that effect.

The invention claimed is:

1. An exhaust-gas aftertreatment system for an internal combustion engine of a vehicle, the exhaust-gas aftertreatment system comprising:
    at least one exhaust line;
    at least one turbocharger; and
    at least one exhaust-gas converter disposed between the internal combustion engine and said at least one turbocharger; and
    at least one exhaust-gas aftertreatment unit disposed downstream of said at least one turbocharger and having a second volume, said first volume of said at least one exhaust-gas converter being larger than said second volume of said at least one exhaust-gas aftertreatment unit.

2. An exhaust-gas aftertreatment system for an internal combustion engine of a vehicle, the exhaust-gas aftertreatment system comprising:
    at least one exhaust line;
    at least one turbocharger; and
    at least one exhaust-gas converter disposed between the internal combustion engine and said at least one turbocharger, said at least one exhaust-gas converter having a first volume of at least 0.6 liters; and at least one exhaust-gas aftertreatment unit disposed downstream of said at least one turbocharger and having a second volume, said first volume of said at least one exhaust-gas converter being larger than said second volume of said at least one exhaust-gas aftertreatment unit.

3. The exhaust-gas aftertreatment system according to claim 2, wherein said at least one exhaust-gas converter and said at least one exhaust-gas aftertreatment unit are constructed to perform the same function.

4. The exhaust-gas aftertreatment system according to claim 2, wherein said at least one exhaust-gas converter includes an oxidation catalytic converter.

5. The exhaust-gas aftertreatment system according to claim 2, wherein said at least one exhaust-gas converter includes an oxidation catalytic converter and a particle separator.

6. The exhaust-gas aftertreatment system according to claim 2, which further comprises a plurality of exhaust line sections, and a collecting chamber for said plurality of exhaust line sections, said at least one exhaust-gas converter being positioned in said collecting chamber.

7. The exhaust-gas aftertreatment system according to claim 2, wherein said at least one turbocharger is constructed with two stages.

8. A method for purifying an exhaust gas of an internal combustion engine with an exhaust-gas aftertreatment system having at least one turbocharger, the method comprising the following steps:
providing exhaust-gas aftertreatment unit according to claim 2;
converting all of the exhaust gas by oxidation to a greater extent between the internal combustion engine and the turbocharger than in a region downstream of the turbocharger.

9. A vehicle, comprising:
an exhaust-gas aftertreatment system according to claim 2;
the internal combustion engine being a lean-burn engine.

10. The exhaust-gas aftertreatment system according to claim 2, wherein said at least one exhaust-gas converter and said at least one exhaust-gas aftertreatment unit are constructed to perform the same function.

* * * * *

UNITED STATES PATENT AND TRADEMARK OFFICE
CERTIFICATE OF CORRECTION

| | | |
|---|---|---|
| PATENT NO. | : 8,544,266 B2 | Page 1 of 1 |
| APPLICATION NO. | : 12/686534 | |
| DATED | : October 1, 2013 | |
| INVENTOR(S) | : Rolf Brück et al. | |

It is certified that error appears in the above-identified patent and that said Letters Patent is hereby corrected as shown below:

In the Claims:

Column 6,

Lines 51-53, "at least one exhaust-gas converter disposed between the internal combustion engine and said at least one turbo-charger, and" should read -- at least one exhaust-gas converter having a first volume and being disposed between the internal combustion engine and said at least one turbo-charger; and --

Column 8,

Lines 17-18, "10. The exhaust-gas aftertreatment system according to claim 2, wherein said" should read -- 10. The exhaust-gas aftertreatment system according to claim 1, wherein said --

Signed and Sealed this
Eighth Day of July, 2014

Michelle K. Lee
*Deputy Director of the United States Patent and Trademark Office*